(12) United States Patent
Narutomi et al.

(10) Patent No.: US 6,434,941 B1
(45) Date of Patent: Aug. 20, 2002

(54) ORDINARY TEMPERATURE HEAT ENGINE

(76) Inventors: Hanako Narutomi, 308, 9-5, Misaki 4-chome Suminoe-ku, Osaka-shi, Osaka 559-0013; Hiroshi Usui, Osaka denshin Club, Nipponbashi Build. 3F, 6-14, Nipponbashi 5-chrome Naniwa-ku, Osaka-shi, Osaka 556-015, both of (JP)

( * ) Notice: Subject to any disclaimer, the term of this patent is extended or adjusted under 35 U.S.C. 154(b) by 0 days.

(21) Appl. No.: 09/701,412
(22) PCT Filed: May 27, 1999
(86) PCT No.: PCT/JP99/02830
§ 371 (c)(1), (2), (4) Date: May 21, 2001
(87) PCT Pub. No.: WO99/64741
PCT Pub. Date: Dec. 16, 1999

(30) Foreign Application Priority Data

Jun. 5, 1998 (JP) ............................................. 10-194945
Mar. 9, 1999 (JP) ............................................. 11-061112

(51) Int. Cl.$^7$ ............................................... F01K 27/00
(52) U.S. Cl. ..................... 60/641.1; 60/641.15; 60/675; 60/651; 60/671
(58) Field of Search ............................ 60/641.1, 641.8, 60/641.11, 641.15, 644.1, 651, 671, 675

(56) References Cited

U.S. PATENT DOCUMENTS 3,255,516 A * 6/1966 Jones ........................... 60/675
4,197,060 A * 4/1980 Chadwick
4,314,077 A * 2/1982 Woinsky ..................... 60/641.3
4,324,102 A * 4/1982 Woinsky ..................... 60/641.3

FOREIGN PATENT DOCUMENTS

| EP | 0392801 | 10/1990 |
|---|---|---|
| JP | 48-19938 | 3/1973 |
| JP | 63-65805 | 4/1988 |
| JP | 2-271081 | 11/1990 |
| JP | 4-17702 | 1/1992 |
| JP | 7-180649 | 7/1995 |
| JP | 8-61219 | 3/1996 |

* cited by examiner

Primary Examiner—Hoang Nguyen
(74) Attorney, Agent, or Firm—Wood, Phillips, VanSanten, Clark & Mortimer

(57) ABSTRACT

A room temperature heat engine, wherein only one pipe structure for connecting a high pressure part to a low pressure part, which is a fatal structural defect of the room temperature heat engine for decorative toys (water drinking bird, peace bird) which merely produces a weak and small mechanical energy, is improved so as to produce much powerful mechanical energy for practical use of the engine, no energy source being required because the energy used for power generation is a beat obtained from the atmospheric temperature, the high and low temperature parts are connected to each other through at least two pipes, the high temperature and low temperature parts are formed in a stationary large-sized structure, two pipes are used exclusively for a gas-only pipe and a liquid-only pipe, and a turbine wheel is installed in the fluid-only pipe so as to turn the waterwheel under a fluid flow from the low temperature part for power generation.

11 Claims, 20 Drawing Sheets

ORDINARY TEMPERATURE HEAT ENGINE

FIELD OF THE INVENTION

The present invention relates to an ordinary temperature heat engine in which an atmospheric temperature is employed as a heat source temperature of a high temperature portion thereof, and a temperature reduced lower than the atmospheric temperature by cooling with water evaporation latent heat is employed as a temperature of a low temperature portion thereof.

BACKGROUND OF THE INVENTION

In high temperature heat engines which are older types of heat engines (internal combustion engines and external combustion engines) such as Watt's steam engines and gasoline engines, an atmospheric pressure and an atmospheric temperature are employed as a pressure of a low pressure portion and a temperature of a low temperature portion, respectively, and a pressure higher than the atmospheric pressure and a temperature higher than the atmospheric temperature are artificially produced in a high pressure portion and a high temperature portion, respectively. For the realization of the artificial high pressure portion and the artificial high temperature portion, an external energy source (coal, oil or the like) is used to be burnt. This is why the older types of heat engines are called "high temperature heat engines".

The high temperature heat engines are still in use, and serve as power source machines capable of converting a heat energy into an electric energy and a dynamic energy which are useful for human beings. Artificial power source machines, thermal power plants and nuclear power plants could not have been realized without the high temperature heat engines,.

The term "artificial high pressure portion" or "artificial high temperature portion" herein means a portion in which a pressure higher than the atmospheric pressure or a temperature higher than the atmospheric temperature is artificially produced by externally applying energy thereto.

The term "natural low pressure portion" or "natural low temperature portion" herein means a portion which is kept at an atmospheric pressure or at an atmospheric temperature without application of any external energy.

In an ordinary temperature heat engine which has been developed in a different way from the older types of heat engines, the temperature of the natural high pressure portion or the natural high temperature portion is employed as the heat source temperature of the high temperature portion, and a temperature reduced lower than the atmospheric temperature by cooling with water evaporation latent heat is employed as the temperature of the artificial low temperature portion. This ordinary temperature heat engine already exists. Another name or popular name of the ordinary temperature heat engine is "water drinking bird" or "peace bird" which is an ornamental toy adapted to keep moving for a long period.

The term "natural high pressure portion" or "natural high temperature portion" herein means a portion which is kept at a natural atmospheric pressure or at a natural atmospheric temperature without application of any external energy or without any special consideration.

The term "artificial low pressure portion" or "artificial low temperature portion" herein means a portion in which a pressure lower than the atmospheric pressure or a temperature lower than the atmospheric temperature is artificially produced with some special consideration and with or without application of external energy.

This ordinary temperature heat engine ("Motive unit utilizing an evaporation bulb" disclosed in Japanese Examined Patent Publication No. 25-2455 (1950)) was invented first in the history in 1948 by a Japanese inventor, Yuji Suda. However, the heat engine produces only a small amount of less intensive dynamic energy and, therefore, does not serve as a feasible motive unit or heat engine, but is a simple dynamic ornamental object.

The ordinary temperature heat engine has a characteristic basic construction such that the high pressure portion is connected to the low pressure portion via a single pipe and, hence, has the following drawbacks:

(1) Since liquid and gas flow up and down in the single pipe (long neck), the liquid and the gas should operate in time staggered manner with a timing difference.

(2) Therefore, a torso portion (high pressure portion, high temperature portion) and a head portion (low pressure portion, low temperature portion) should be arranged in an equilibrium and reciprocal structure. With a perfect equilibrium structure, the torso portion and the head portion are immovable under equilibrium. However, a slightly non-equilibrium state is produced by causing the liquid to flow up and down in the single pipe (long neck) connecting the torso portion and the head portion, thereby bringing the torso portion and the head portion into reciprocal motion. The dynamic energy to be produced with this structure is very small and weak. The ordinary temperature heat engine is called "water drinking bird", because the reciprocal motion thereof looks as if a bird is drinking water.

Even if the size of the water drinking bird is totally increased, the dynamic energy to be generated and extracted by the reciprocal motion which produces the slightly non-equilibrium state of the ordinary temperature heat engine is rarely increased. In addition, the ordinary temperature heat engine does not properly operate due to friction of its own weight, because the weight thereof is increased generally proportionally to the third power of the size thereof.

In view of the aforesaid problems associated with the conventional ordinary temperature heat engine (water drinking bird), the present invention provides an ordinary temperature heat engine which incorporates a structure other than the equilibrium and reciprocal structure to cause the liquid to flow up and down.

The liquid is caused to flow up and down, while the torso portion (high pressure portion, high temperature portion) and the head portion (low pressure portion, low temperature portion) are fixed in position. Energy obtained during the flow down is converted by an impeller and extracted to the outside for work. The invention is directed to provision of a feasible motive unit or heat engine which is capable of generating a great amount of intensive energy.

DISCLOSURE OF THE INVENTION

In accordance with a first aspect of the present invention to achieve the aforesaid object, a high temperature portion and a low temperature portion are connected to each other via at least two pipes, and an on-off valve is provided for increasing and reducing a pressure difference between the high temperature portion and the low temperature portion.

That is, the invention provides an ordinary temperature heat engine which is capable of converting a heat energy in the atmosphere into a dynamic energy to generate a great amount of intensive energy for practical use for work.

In the ordinary temperature heat engine which employs an atmospheric temperature as a heat source temperature of the high temperature portion, the high temperature portion which employs the atmospheric temperature as the heat source temperature and the low temperature portion which has a temperature reduced lower than the atmospheric temperature by cooling with water evaporation latent heat are connected to each other via two or more pipes. Thus, the high temperature portion and the low temperature portion are fixed to be arranged in a non-equilibrium and non-reciprocal structure.

In accordance with a second aspect of the invention, there is provided an ordinary temperature heat engine which comprises: a liquefying chamber in which a volatile liquid filled therein is liquefied at a temperature lower than an ordinary temperature; a vaporizing chamber in which a volatile liquid retained therein is vaporized at a temperature not lower than the ordinary temperature; a first communication pipe for communication between the liquefying chamber and a port provided at a level lower than the level of the volatile liquid in the vaporizing chamber; and a second communication pipe for communication between the liquefying chamber and a port provided at a level higher than the level of the volatile liquid in the vaporizing chamber, wherein the first communication pipe has a liquid level elevating portion which vertically extends for allowing the level of the volatile liquid to be elevated therein by a pressure difference between the liquefying chamber and the vaporizing chamber, wherein an on-off valve is provided in the second communication pipe for reducing the pressure difference between the liquefying chamber and the vaporizing chamber.

That is, the ordinary temperature heat engine according to the present invention comprises the liquefying chamber in which the volatile liquid filled therein is liquefied at the temperature lower than the ordinary temperature; the vaporizing chamber in which the volatile liquid retained therein is vaporized at the temperature not lower than the ordinary temperature; the first communication pipe for communication between the liquefying chamber and the port provided at the level lower than the level of the volatile liquid in the vaporizing chamber; and the second communication pipe for communication between the liquefying chamber and the port provided at the level higher than the level of the volatile liquid in the vaporizing chamber, wherein the first communication pipe has the liquid level elevating portion which vertically extends for allowing the level of the volatile liquid to be elevated therein by the pressure difference between the liquefying chamber and the vaporizing chamber, wherein the on-off valve is provided in the second communication pipe for reducing the pressure difference between the liquefying chamber and the vaporizing chamber. With the on-off valve being closed, the pressure in the liquefying chamber is reduced by the liquefaction of the volatile liquid in the liquefying chamber, and the pressure in the vaporizing chamber is increased by the vaporization of the volatile liquid in the vaporizing chamber. The pressure difference between the liquefying chamber and the vaporizing chamber causes the volatile liquid to rise within the liquid level elevating portion of the first communication pipe. When the on-off valve is thereafter opened, the pressure difference between the liquefying chamber and the vaporizing chamber is reduced, so that the volatile liquid elevated in the liquid level elevating portion of the first communication pipe flows down. When the on-off valve is closed again, the pressure difference between the liquefying chamber and the vaporizing chamber is increased, so that the volatile liquid rises within the liquid level elevating portion. By thus repeating the opening and closing of the on-off valve, the volatile liquid repeatedly flows up and down.

Where the ordinary temperature heat engine further comprises energy converting means provided in the liquid level elevating portion of the first communication pipe for converting the kinetic energy of the volatile liquid into other kind of energy, the kinetic energy being produced by allowing the volatile liquid to flow down in the first communication pipe when the pressure difference between the liquefying chamber and the vaporizing chamber is reduced, the kinetic energy of the volatile liquid repeatedly flowing down in the first communication pipe is converted into the other kind of energy by causing the volatile liquid to repeatedly flow up and down. The converted energy can efficiently be utilized. That is, the energy can be generated by repeating the opening and closing of the on-off valve.

Where heat exchange means for promoting the vaporization of the inside volatile liquid is provided in the vaporizing chamber in the ordinary temperature heat engine, the vaporization of the volatile liquid within the vaporizing chamber is promoted, so that the pressure difference between the liquefying chamber and the vaporizing chamber is increased for promotion of the elevation of the volatile liquid in the first communication pipe.

Where a cover member is provided for covering the surface of the volatile liquid rising in the liquid level elevating portion of the first communication pipe, a little surface area of the volatile liquid is exposed, so that the vaporization of the volatile liquid is reduced when the volatile liquid is liquefied in the liquefying chamber with a pressure reduction. Therefore, the reduction in the efficiency of the liquefaction of the volatile liquid is prevented which may otherwise occur due to dew-point elevation.

Where the ordinary temperature heat engine is adapted to close the on-off valve when the level of the volatile liquid within the vaporizing chamber is elevated and to open the on-off valve when the level of the volatile liquid within the vaporizing chamber is lowered, the volatile liquid is liquefied in the liquefying chamber to reduce the pressure, and vaporized in the vaporizing chamber to increase the pressure with the on-off valve being closed. With the pressure difference, the volatile liquid within the vaporizing chamber rises in the first communication pipe, so that the liquid level is lowered in the vaporizing chamber. The lowering of the liquid level in the vaporizing chamber opens the on-off valve, so that the liquefying chamber and the vaporizing chamber are brought into communication with each other via the second communication pipe. Thus, the pressure difference is reduced, whereby the volatile liquid flows down in the first communication pipe. When a predetermined amount of the liquid flows down, the level of the volatile liquid rises, so that the on-off valve is closed again. Thus, the opening and closing of the on-off valve is automatically repeated by the up and down of the liquid level.

Where the energy converting means in the ordinary temperature heat engine comprises a rotary wheel to be rotated by the volatile liquid flowing down in the first communication pipe and a power generator for generating electricity by the torque of the rotary wheel, an electric energy generated by the power generator can efficiently be utilized.

Where the ordinary temperature heat engine is adapted to cool the liquefying chamber and heat the vaporizing chamber by the electric energy generated by the power generator, the cooling of the liquefying chamber and the heating of the vaporizing chamber are achieved by utilizing the electric energy generated by the flow down of the volatile liquid, so that the up and down of the volatile liquid in the first communication pipe is promoted. Thus, the ordinary temperature heat engine can be operated very efficiently.

The terms herein used will be defined as follows:

The term "ordinary temperature heat engine" means a heat engine in which the temperature of the natural high pressure portion or the natural high temperature portion is employed as the heat source temperature of the high temperature portion, and the artificial low pressure portion or the artificial low temperature portion is employed as the low temperature portion, or a heat engine which converts the energy of a great amount of fluid into a dynamic energy.

The term "ordinary temperature heat engine generating a small amount of dynamic energy" means a heat engine called "peace bird" or "water drinking bird" invented in 1948 (disclosed in Japanese Examined Patent Publication No. 25-2455 (1950)). The ordinary temperature heat engine is adapted to convert the thermal energy of the atmosphere into a dynamic energy, but is capable of generating only a small amount of less intensive dynamic energy. Therefore, the ordinary temperature heat engine is not feasible as a motive unit or a heat engine, but is a simple ornamental object which is adapted to keep moving for a long period. This is also called "water drinking bird" or "happy bird".

The term "ordinary temperature heat engine generating a great amount of dynamic energy" means the ordinary temperature heat engine according to the present invention. The ordinary temperature heat engine is adapted to convert the thermal energy of the atmosphere into a dynamic energy to generate a great amount of dynamic energy for practical application for work. The present invention provides an ordinary temperature heat engine of the next generation which involves an improvement over the conventional ordinary temperature heat engine which generates a very small amount of dynamic energy.

The terms "high temperature portion", "high pressure portion", "high temperature chamber", "high pressure chamber", "heat source portion", "heat source chamber", "heating portion", "heating chamber", "heat absorbing portion", "heat absorbing chamber" and "vaporizing chamber" basically fall within the same category.

The terms "low temperature portion", "low pressure portion", "low temperature chamber", "low pressure chamber", "cooling portion", "cooling chamber", "evaporating portion", "evaporating chamber", "heat releasing portion", "heat releasing chamber" and "liquefying chamber" basically fall within the same category.

The terms "operating medium liquid" and "volatile liquid" basically fall within the same category.

The expression "a great amount of fluid" means gaseous atmospheric air, liquid sea water, or water in a lake, a river, a pond, a dam or the like among various types of fluids which are present abundantly on the earth.

The term "atmospheric temperature" means the temperature of the atmosphere as well as the temperature of the great amount of fluid or liquid throughout the specification.

BEST MODE FOR CARRYING OUT THE INVENTION

Embodiments of the ordinary temperature heat engine according to the present invention will hereinafter be described in detail with reference to the attached drawings.

Figure 1:
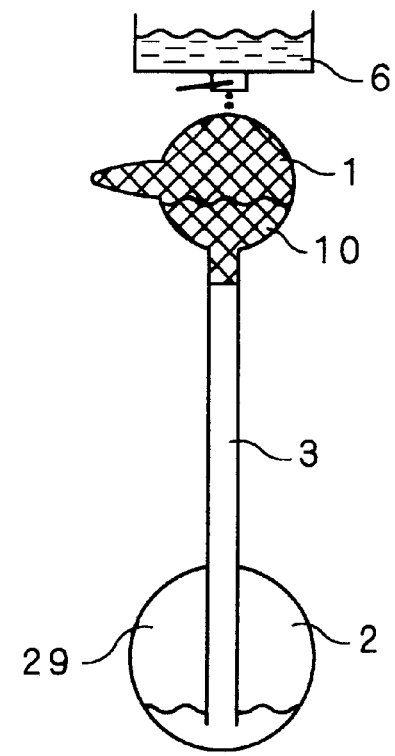
FIG. 1 is a see-through side view illustrating the overall construction of a water drinking bird.

FIG. 1 is a diagram illustrating the overall construction of a conventional water drinking bird but with its legs being omitted and with a water dripping vessel being added thereto.

An explanation will first be given to notations in the drawings. Liquid water is denoted by a multiplicity of short horizontal lines, while liquid ethyl ether is denoted by no pattern or not specifically marked. These notations are consistent throughout the specification.

A detailed explanation will be given. FIG. 1 illustrates a state where a water drinking bird body 29 is vertically fixed. A head portion (low temperature portion, low pressure portion, liquefying chamber) 1 affixed with a beak and a cloth is wetted with drops of water from the water dripping vessel 6. When the water evaporates from the wetted head portion (low temperature portion, low pressure portion) 1, the inside ethyl ether is liquefied, so that the inside pressure of the head portion (low temperature portion, low pressure portion) 1 is reduced. Thus, the liquid ethyl ether (volatile liquid) 10 rises from a torso portion (high temperature portion, high pressure portion, vaporizing chamber) 2 in a long neck 3. This figure shows that the liquid ethyl ether has risen to the middle of the head portion (low temperature portion, low pressure portion) 1.

Even with the water drinking bird body 29 vertically standing, the liquid ethyl ether 10 rises. However, the liquid ethyl ether 10 does not flow down in this state. A consideration is given to how to cause the liquid ethyl ether 10 to flow down with the water drinking bird body 29 being held vertically.

A reason why the liquid is kept elevated and does not flow down is that the torso portion (high temperature portion, high pressure portion) 2 has a higher inside pressure than the head portion (low temperature portion, low pressure portion) 1 to keep the liquid ethyl ether 10 elevated.

FIGS. 2 to 6 are explanatory diagrams illustrating why the present invention generates energy in accordance with the steps of an operating principle.

Figure 2:
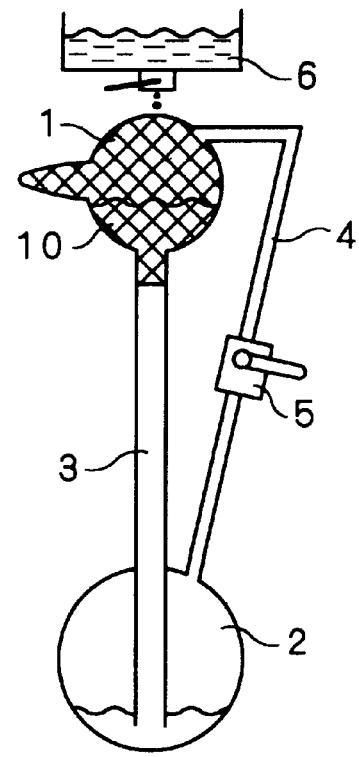
FIG. 2 is a see-though side view illustrating Step 1 of an operating principle for generation of energy.

FIG. 2 shows basically the same construction as FIG. 1. As shown, a difference is that a second pipe (gas pipe, second communication pipe) 4 with a closed on-off valve (on-off valve) 5 is provided in addition to the long neck (common gas/liquid pipe, liquid pipe, first communication pipe) 3 between the head portion (low temperature portion, low pressure portion) 1 and the torso portion (high temperature portion, high pressure portion) 2. The long neck 3 has a lower open end located at a level lower than the level of the liquid ethyl ether within the torso portion 2, and communicates with the head portion 1. The second pipe 4 has a lower open end located at a level higher than the level of the liquid ethyl ether within the torso portion 2, and communicates with the head portion 1. This state is completely the same as the state shown in FIG. 1, so that the liquid ethyl ether 10 elevated into the head portion (low temperature portion, low pressure portion) 1 does not flow down. This state is shown in FIG. 2.

Figure 3:
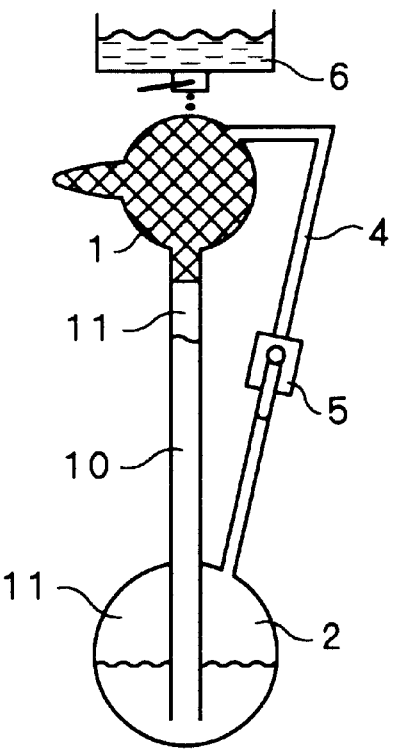
FIG. 3 is a see-though side view illustrating Step 2 of the operating principle for the energy generation.

FIG. 3 shows basically the same construction as FIG. 2. As shown, a difference is that the on-off valve 5 provided on the second pipe 4 is open. With the on-off valve 5 being open, the pressure of gaseous ethyl ether 11 in the head portion (low temperature portion, low pressure portion) 1 is equalized with that in the torso portion (high temperature portion, high pressure portion) 2. When these portions 1, 2 communicate with each other at the same pressure, the liquid ethyl ether 10 starts flowing down by gravity. This state is shown in FIG. 3.

Figure 4:
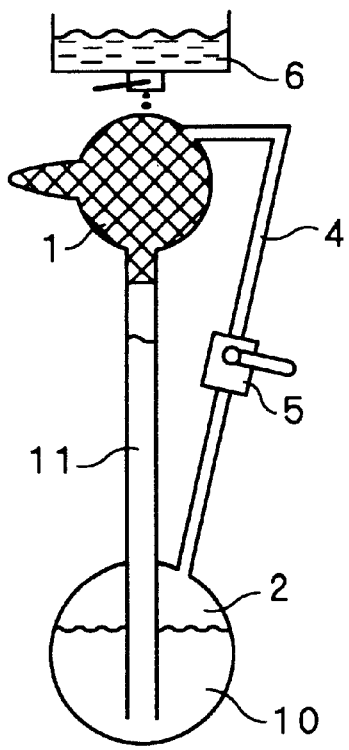
FIG. 4 is a see-though side view illustrating Step 3 of the operating principle for the energy generation.

FIG. 4 shows basically the same construction as FIG. 3. As shown, a difference is that the on-off valve 5 is closed again. Since the on-off valve 5 is open in FIG. 3, the portions 1, 2 communicate with each other at the same pressure. Therefore, the liquid ethyl ether 10 starts flowing down by gravity thereby to entirely return into the torso portion (high temperature portion, high pressure portion) 2. Then, the on-off valve 5 is closed again. This state is shown in FIG. 4.

Figure 5:
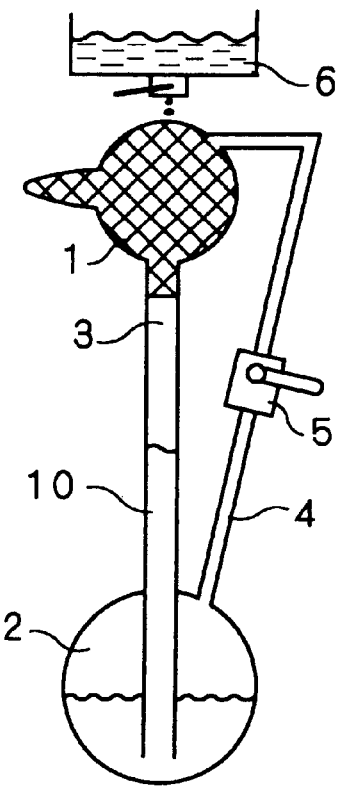
FIG. 5 is a see-though side view illustrating Step 4 of the operating principle for the energy generation.

FIG. 5 shows basically the same construction as FIG. 4. The on-off valve 5 is kept closed.

The head portion (low temperature portion, low pressure portion) 1 affixed with the beak and the cloth is wetted with drops of water from the water dripping vessel 6. The water evaporates from the wetted head portion and beak, so that the inside pressure of the head portion is reduced. This produces a pressure difference between the portions 1 and 2. Since the head portion (low temperature portion, low pressure portion) 1 has a reduced inside pressure, the liquid ethyl ether 10 starts flowing up again against gravity. The liquid ethyl ether 10 starts flowing up to rise to the middle of the long neck (common gas/liquid pipe, liquid pipe) 3. This state is shown in FIG. 5.

Figure 6:
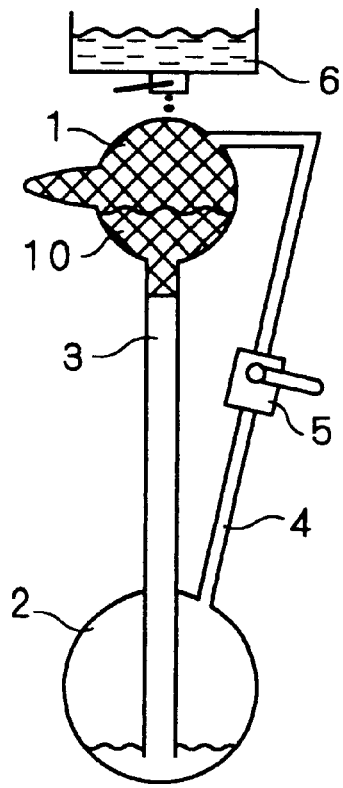
FIG. 6 is a see-though side view illustrating Step 5 of the operating principle for the energy generation.

FIG. 6 shows basically the same construction as FIGS. 5 and 2. The on-off valve 5 is still closed. The liquid ethyl ether 10 rises again to the middle of the head portion (low temperature portion, low pressure portion) 1. This state is shown in FIG. 6. FIGS. 6 and 2 show the same state. FIGS. 2 to 6 show one cycle of the entire process. The process sequence shown in FIGS. 2 to 6 is thereafter repeated.

Figure 7:
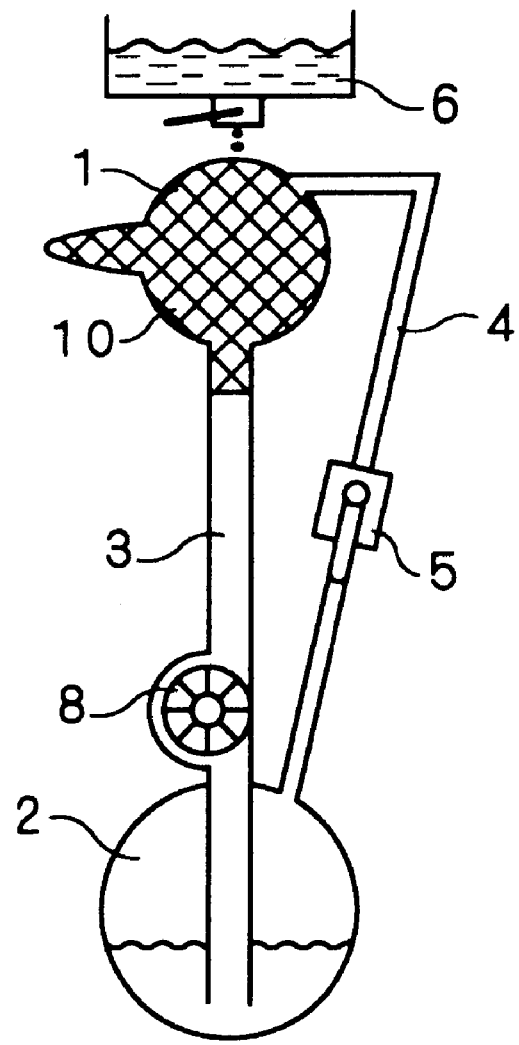
FIG. 7 is a see-through side view illustrating the overall construction of a water drinking bird provided with an impeller box.

FIG. 7 shows basically the same construction as FIGS. 2 to 6. As shown, a difference is that an impeller box 8 is provided in the long neck (common gas/liquid pipe, liquid pipe, first communication pipe) 3. An impeller is rotated when the liquid ethyl ether 10 flows down. The torque of the impeller is transmitted to the outside for work.

An embodiment of the ordinary temperature heat engine according to the present invention will be described in detail with reference to the attached drawings.

Figure 8:
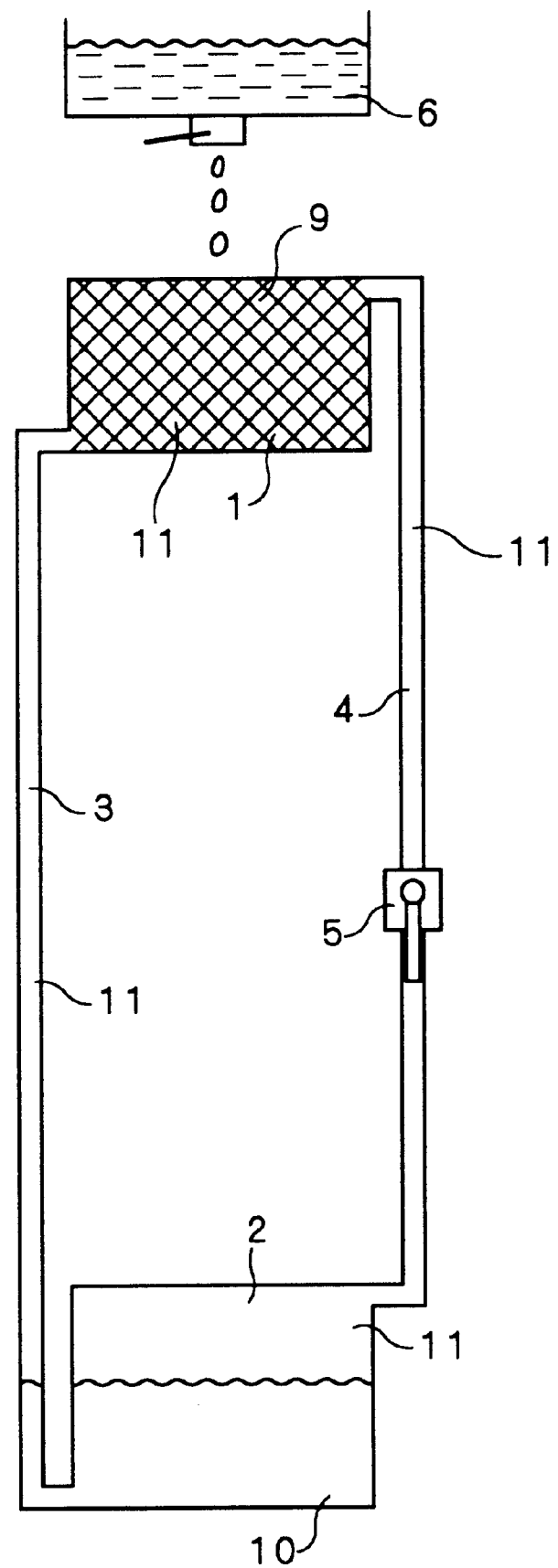
FIG. 8 is a see-through front view of the overall construction illustrating a basic principle of the present invention, i.e., Step A of an operating principle for generation of energy.

A detailed explanation will be given to the construction shown in FIG. 8. FIG. 8 shows basically the same construction as FIG. 2. This construction is of a type in which all the structures in the system are completely sealed. A lower cubic vessel is the torso portion (high temperature portion, high pressure portion, vaporizing chamber) 2, and all the six walls thereof are formed of a metal (copper). Liquid ethyl ether (operating medium liquid, volatile liquid) 10, which is vaporized at an ordinary temperature, is filled in the torso portion to about one half of the volume thereof. The upper half of the torso portion is filled with gaseous ethyl ether 11 resulting from the vaporization of the liquid.

An upper cubic vessel is the head portion (low temperature portion, low pressure portion, liquefying chamber) 1, which is filled with gaseous ethyl ether 11, and all the six walls thereof are formed of a metal (copper). A cloth (gauze or nonwoven fabric) 9 or paper is affixed onto the entire outer surface of the metal. The amount of drops of water to be dripped is controlled by the degree of opening of a valve attached to a water dripping vessel 6. The cloth 9 is wetted with the water drops. Since the water removes evaporation latent heat during natural evaporation thereof, the head portion (low temperature portion, low pressure portion, liquefying chamber) 1 is cooled. By the cooling, a part of the inside gaseous ethyl ether 11 is liquefied and condensed into the liquid ethyl ether 10. Therefore, the inside pressure is reduced to a negative or lower pressure.

A right-hand pipe is the second pipe (gas pipe, second communication pipe) 4, in which the on-off valve 5 is provided. The second pipe is filled with the vaporized gaseous ethyl ether 11. The second pipe 4 extends from an opening located at a level higher than the level of the liquid ethyl ether in the torso portion 2, and communicates with the head portion 1. A left-hand pipe is the long neck (common gas/liquid pipe, liquid pipe, first communication pipe) 3. The long neck 3 extends upward from an opening located at a level lower than the level of the liquid ethyl ether in the torso portion 2, and communicates with the head portion 1. Thus, an upper portion of the pipe is filled with the vaporized gaseous ethyl ether 11, while a lower portion of the pipe is filled with the liquid ethyl ether to the same level as the level of the liquid ethyl ether 10 in the torso portion (high temperature portion, high pressure portion) 2. The long neck 3 extends vertically, and serves as a liquid level elevating portion, in which the level of the liquid ethyl ether (volatile liquid) 10 is elevated by a pressure difference between the head portion (liquefying chamber) 1 and the torso portion (vaporizing chamber) 2. The cubic torso portion (high temperature portion, high pressure portion, vaporizing chamber) 2 and the long neck (common gas/liquid pipe, liquid pipe, first communication pipe) 3 serve as a communication pipe.

Although the torso portion (high temperature portion, high pressure portion, vaporizing chamber) 2 and the head portion (low temperature portion, low pressure portion, liquefying chamber) 1 are connected to each other via two pipes in FIG. 8, two or more pipes may be employed for the connection. The second pipe (gas pipe, second communication pipe) 4 may include a plurality of pipes, i.e., two, three or more pipes. The long neck (common gas/liquid pipe, liquid pipe, first communication pipe) 3 may include a plurality of pipes, i.e., two, three or more pipes.

FIGS. 8 to 12 are diagrams of the basic overall construction of the present invention for explaining why this construction causes the liquid to flow up and down in accordance with the steps of an operating principle. That is, FIGS. 8 to 12 are diagrams for explaining why the feasible ordinary temperature heat engine according to the present invention is capable of generating a great amount of intensive energy in accordance with the steps of the operating principle.

Step A shown in FIG. 8. The on-off valve 5 is open. The cubic torso portion (high temperature portion, high pressure portion, vaporizing chamber) 2 is filled with the liquid ethyl ether 10 to one half of the volume thereof. The left-hand long neck (common gas/liquid pipe, liquid pipe, first communication pipe) 3 is also a communication pipe in which the liquid is present at the same level as in the torso portion. However, the liquid ethyl ether 10 does not rise in the long neck.

Figure 9:
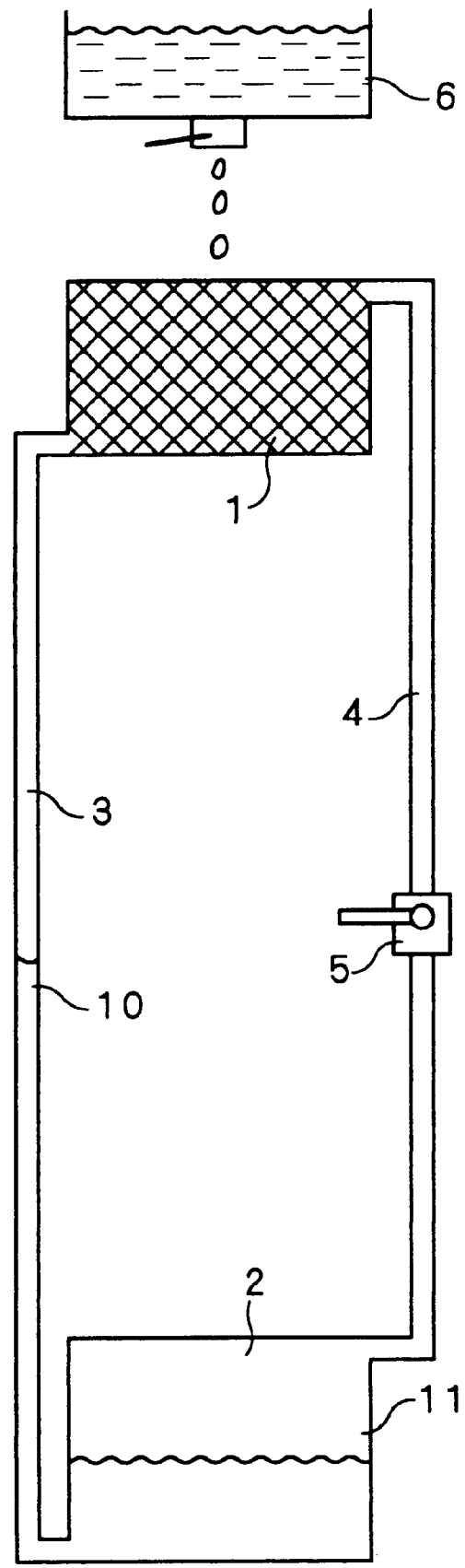
FIG. 9 is a see-though front view illustrating Step B of the operating principle for the energy generation.

Step B shown in FIG. 9. The on-off valve 5 is closed. Thus, a pressure difference is produced between the head portion l and the torso portion 2 by liquefaction of the ethyl ether in the head portion 1. The inside pressure of the cubic torso portion (high temperature portion, high pressure portion, vaporizing chamber) 2 is increased or 1 atm, while the inside pressure of the cubic head portion (low temperature portion, low pressure portion, liquefying chamber) 1 is a negative or reduced pressure due to the cooling by the evaporation of water. Therefore, the liquid ethyl ether 10 starts rising in the long neck. In this figure, the level of the liquid is elevated to the middle of the left-hand long neck (common gas/liquid pipe, liquid pipe, fist communication pipe) 3.

The cubic head portion (low temperature portion, low pressure portion, liquefying chamber) 1 is wetted with drops of water from the water dripping vessel 6, and the water is evaporated. Therefore, the head portion has a lower inside pressure.

Figure 10:
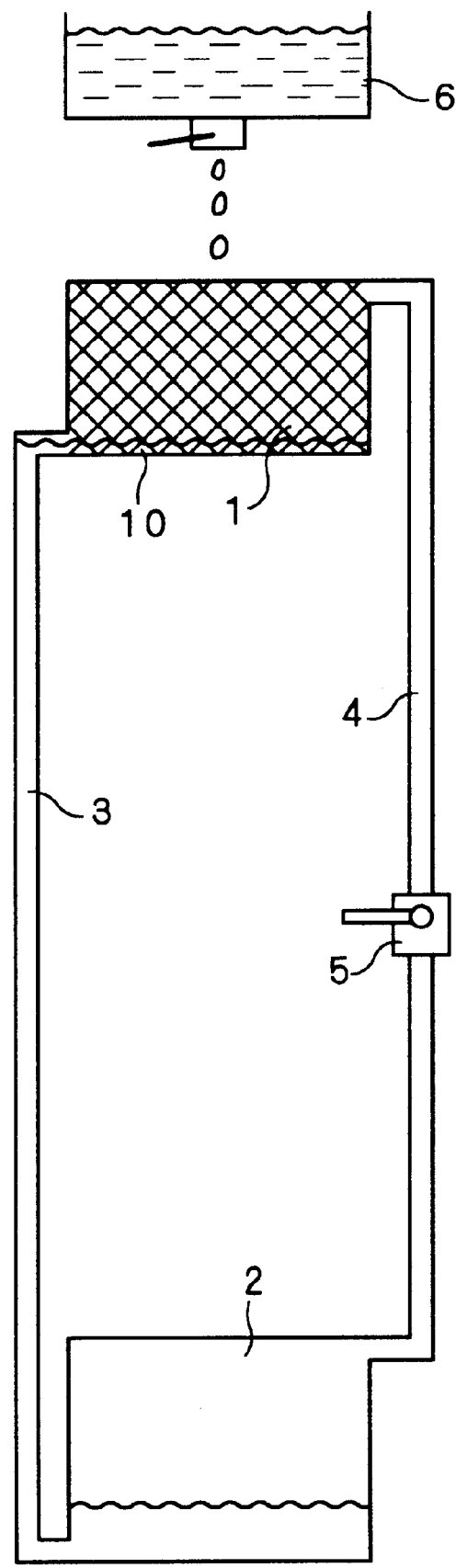
FIG. 10 is a see-though front view illustrating Step C of the operating principle for the energy generation.

Step C shown in FIG. 10. The on-off valve 5 is closed, so that the pressure difference between the head portion 1 and the torso portion 2 is further increased. The inside pressure of the cubic head portion (low temperature portion, low pressure portion, liquefying chamber) 1 is further reduced, whereby the liquid ethyl ether 10 flows up against gravity to reach the level of the cubic head portion (low temperature portion, low pressure portion, liquefying chamber) 1. This state is shown in FIG. 10.

Figure 11:
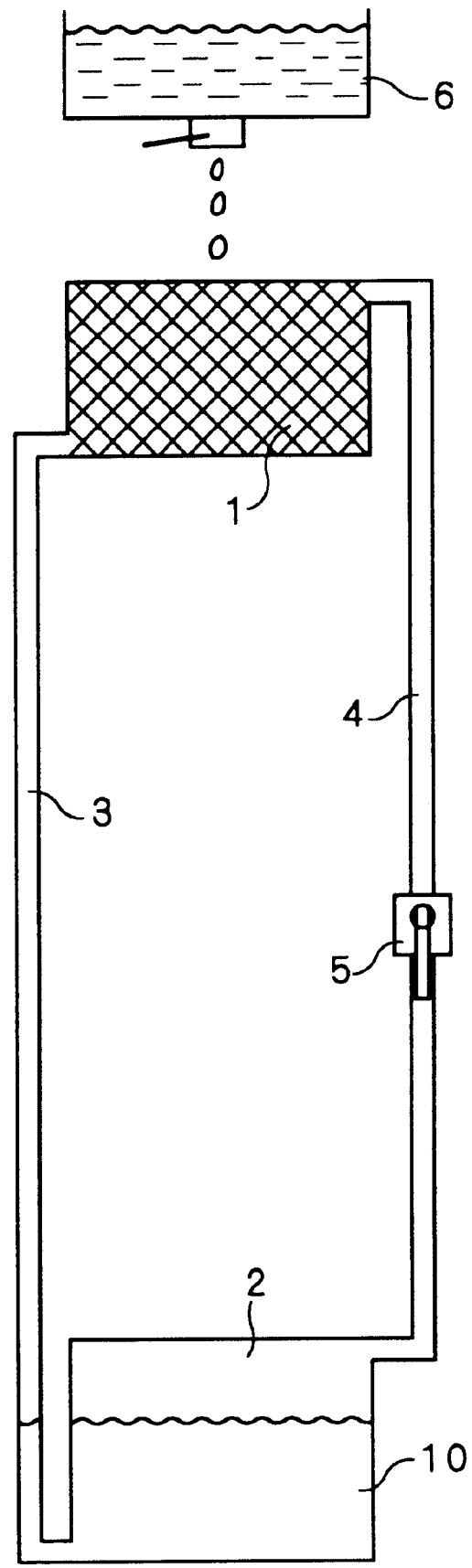
FIG. 11 is a see-though front view illustrating Step D of the operating principle for the energy generation.

Step D shown in FIG. 11. When the on-off valve 5 is opened, the pressure difference between the cubic head portion (low temperature portion, low pressure portion, liquefying chamber) 1 and the cubic torso portion (high temperature portion, high pressure portion, vaporizing chamber) 2 is reduced and, ultimately, the pressure levels in these portions are equalized. When the head portion 1 and the torso portion 2 communicate with each other to be equalized, the liquid ethyl ether 10 starts flowing down by gravity. All the liquid present in the left-hand long neck (common gas/liquid pipe, liquidpipe, first communication pipe) 3 flows down back into the cubic torso portion (high temperature portion, high pressure portion, vaporizing chamber) 2, thus returning to the same state as in FIG. 8. This state is shown in FIG. 11.

Figure 12:
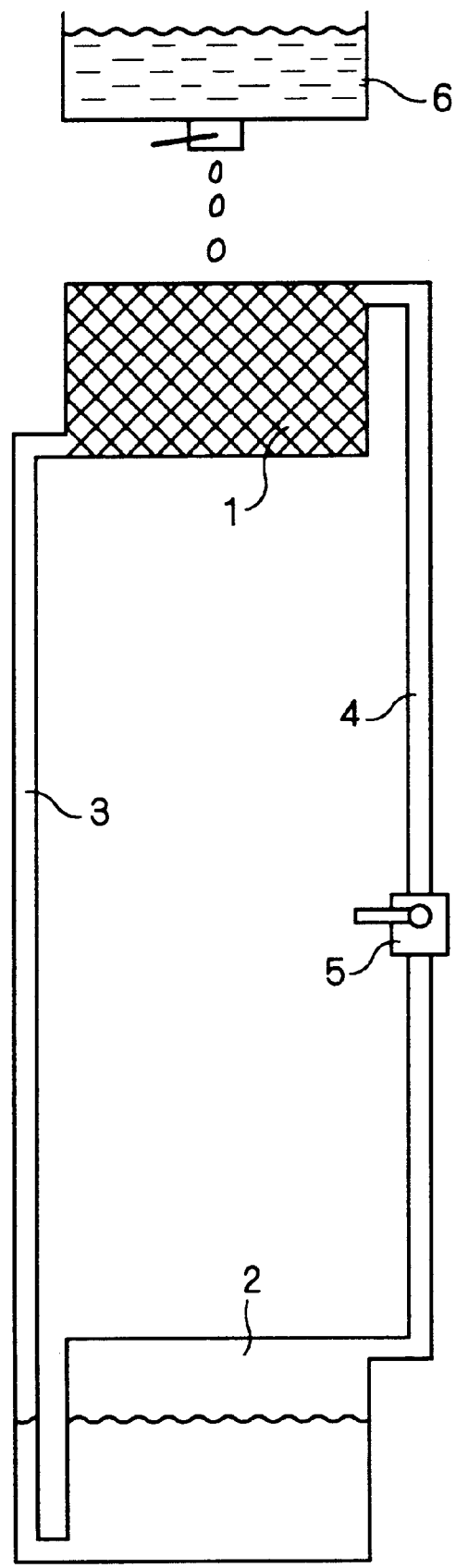
FIG. 12 is a see-though front view illustrating Step E of the operating principle for the energy generation.

Step E shown in FIG. 12. The on-off valve 5 is closed again in the state shown in FIG. 11. This state is intermediate between the states shown in FIGS. 8 and 9. FIGS. 8 to 12 show one cycle of the entire process. The process sequence shown in FIGS. 8 to 12 is thereafter repeated.

Figure 13:
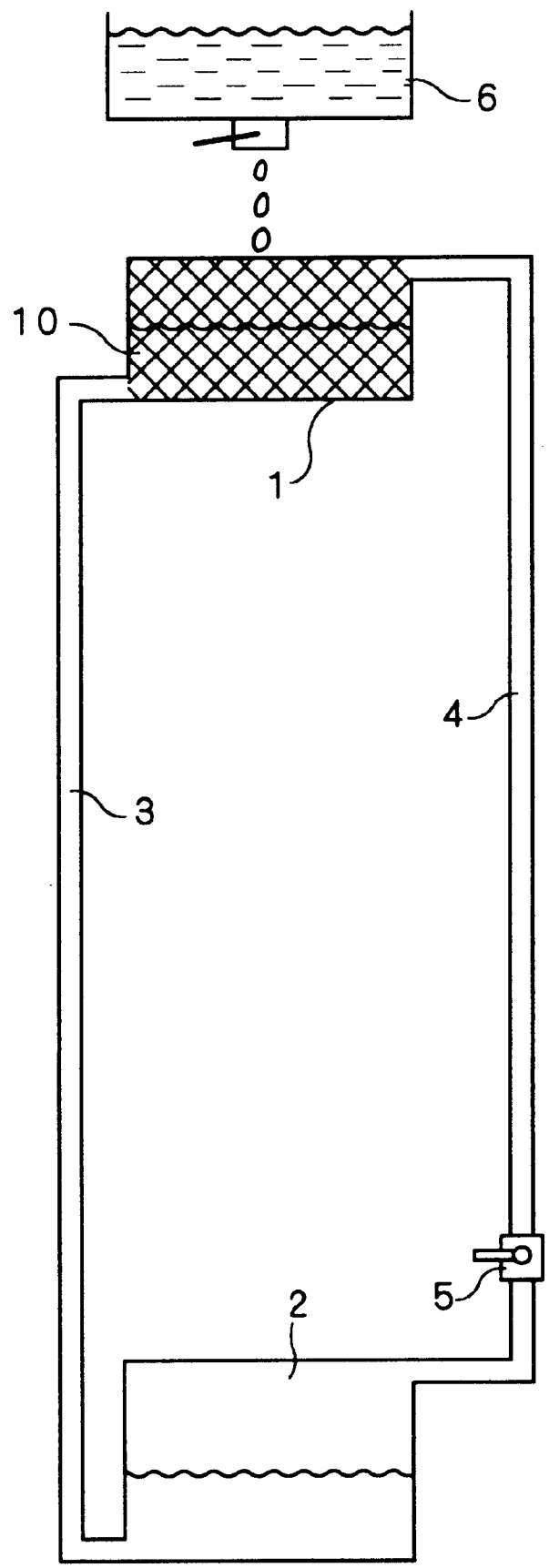
FIG. 13 is a see-though front view illustrating the overall construction with a head portion or a low pressure portion shown on a greater scale.
Figure 14:
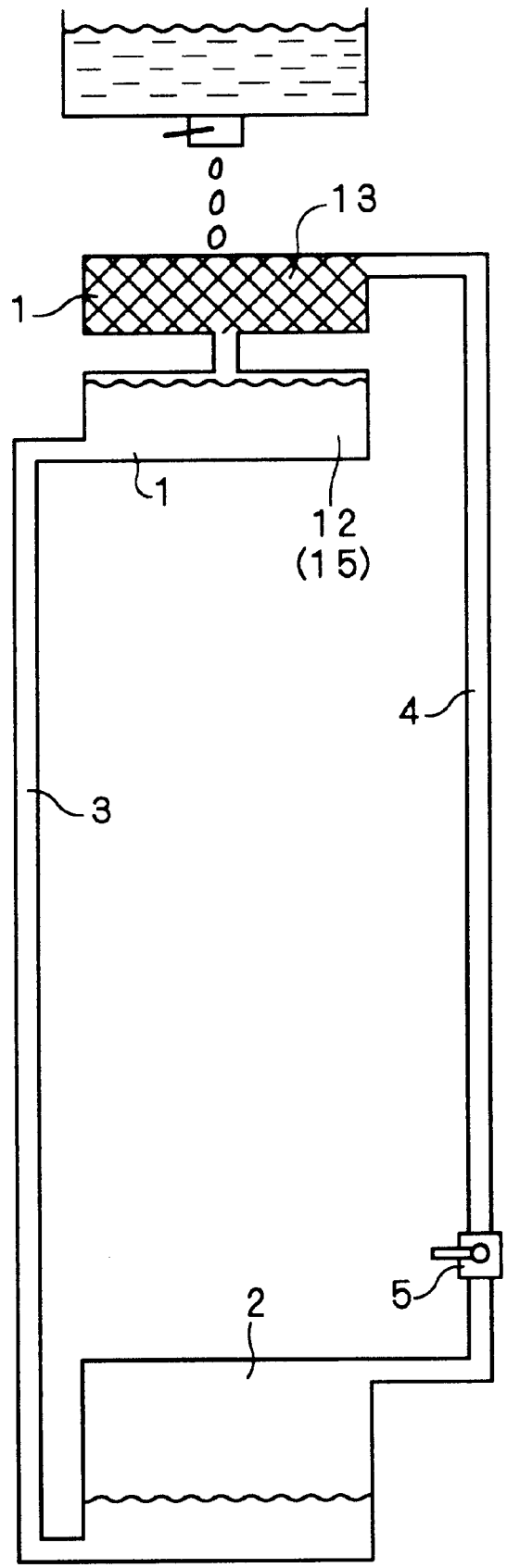
FIG. 14 is a see-through front view illustrating the overall construction with the head portion or the low pressure portion shown on a greater scale.
Figure 15:
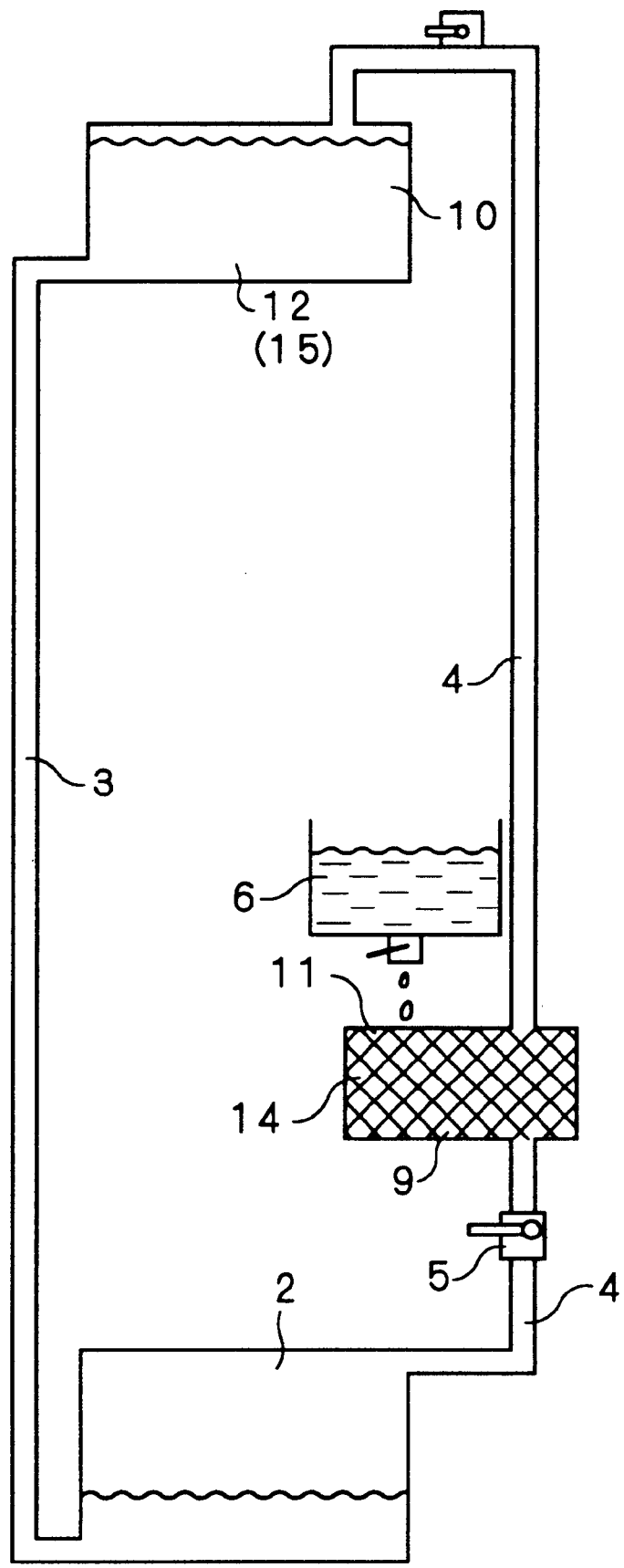
FIG. 15 is a see-through front view illustrating the overall construction provided with a liquefying portion and a liquid trap portion.

With reference to FIGS. 13 to 15, an explanation will be given to a state where the head portion (low temperature portion, low pressure portion) 1 is divided into a liquid trap portion 12 and a liquefying portion 14.

FIG. 13 shows that the liquid ethyl ether 10 further rises to be filled in the cubic head portion (low temperature portion, low pressure portion, liquefying chamber) 1 to one half of the volume thereof.

In FIG. 14, the cubic head portion (low temperature portion, low pressure portion, liquefying chamber) 1 is divided into a gas part and a liquid trap part, which respectively serve as a gas portion 13 and a liquid trap portion 12.

In FIG. 15, the gas portion 13 is separated as an independent portion, which is located at a lower level to serve as the liquefying portion 14. The liquid trap portion 12 is located at the top. The gas portion 13 is specifically designed as the liquefying portion 14 for the liquefaction, and the liquid portion 15 is specifically designed as the liquid trap portion 12. This structure provides a lot of advantages as follows. All the six faces of the liquid trap portion 12 are covered with a heat insulator for heat insulation. Thus, additional vaporization of the liquid ethyl ether 10 in the liquid trap portion 12 can be suppressed which may otherwise be caused when the liquid is warmed from the periphery thereof under reduced pressure. Further, when all the six faces of the liquefying portion 14 covered with the cloth 9 are wetted, the liquefaction of the gaseous ethyl ether 11 can be promoted.

Figure 16:
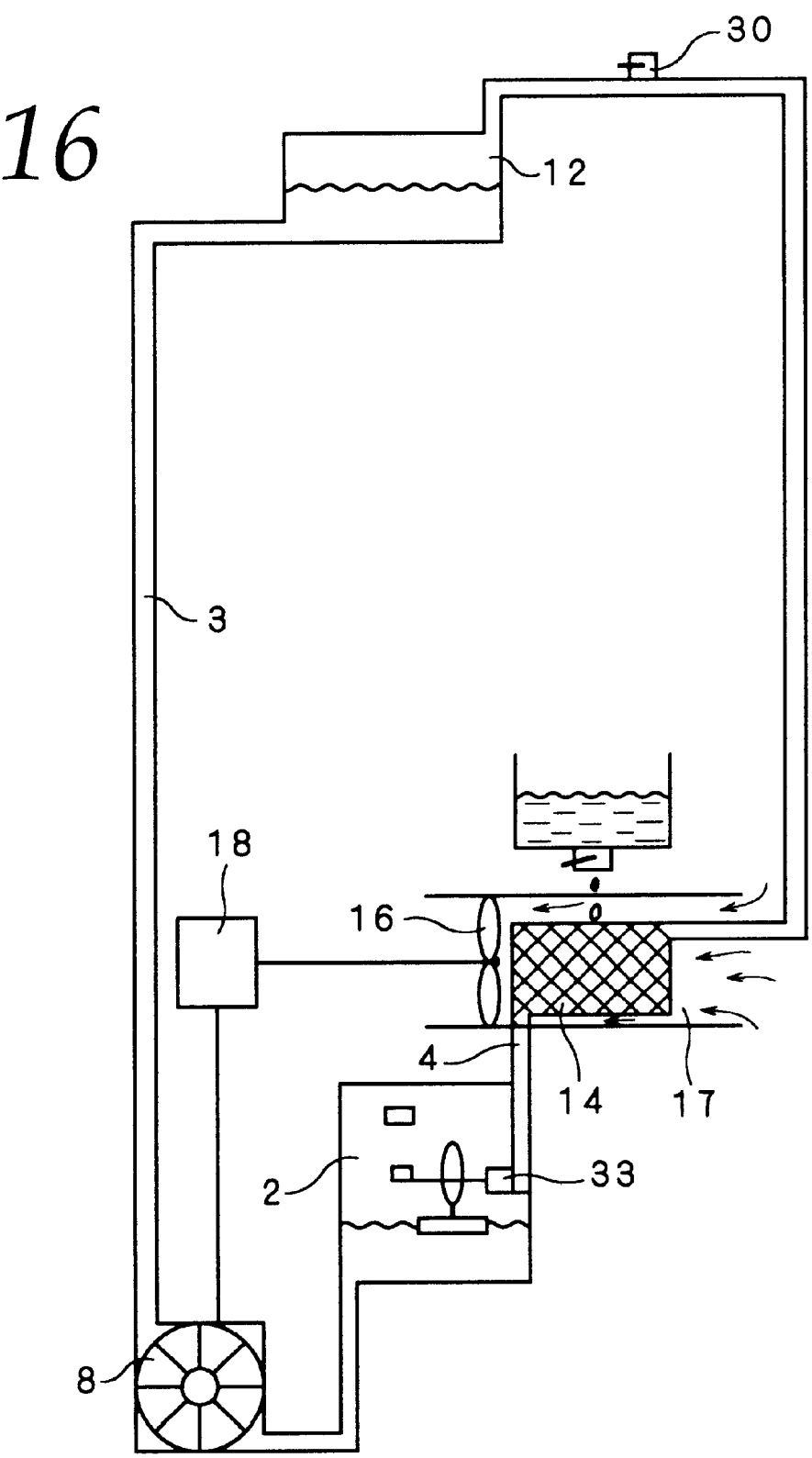
FIG. 16 is a see-through front view illustrating the overall construction according to a prototype embodiment of the invention.

FIG. 16 is a diagram illustrating the overall construction of an embodiment of the present invention.

An impeller box 8 is disposed under a first communication pipe 3 which extends upward and serves as the liquid level elevating portion. The impeller box 8 is provided at a level lower than the torso portion (high temperature portion, high pressure portion) 2. The torque of the impeller box 8 is transmitted to a fly wheel structure 18 via a free shaft as will be described later. The provision of the fly wheel structure 18 is because a rotary fan 16 should be stopped when the impeller is rotated and rotated when the impeller is stopped. After the torque is accumulated, the rotary fan 16 is rotated to blow air into a cavity 17. The blown air enhances the effect of cooling the liquefying portion 14. An air release valve 30 is provided at a level higher than the liquid trap portion 12.

Figure 17:
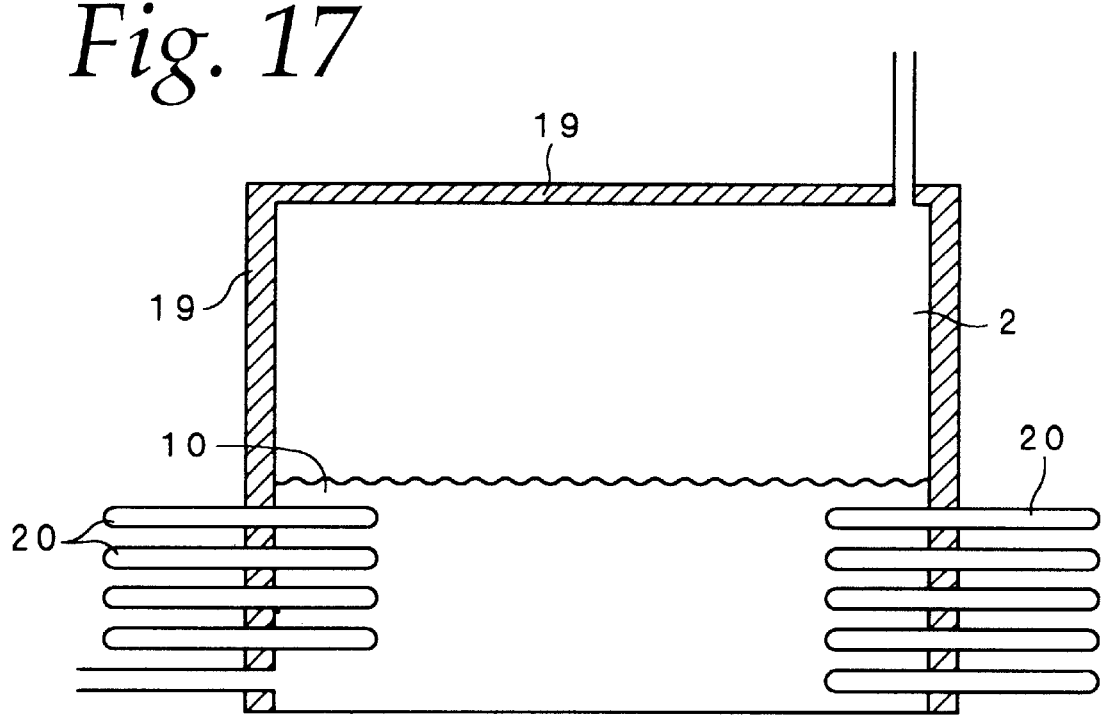
FIG. 17 is a see-through front view illustrating an improved torso portion on a greater scale.

FIG. 17 is a diagram of a construction which includes an improvement in the torso portion (high temperature portion, high pressure portion, vaporizing chamber) 2.

The ceiling and the interior surfaces of four side walls are covered with a heat insulator 19 to prevent the gaseous ethyl ether from being heated. A metal (copper) plate is provided at the bottom, and heat pipes (heat exchanging means) 20 are provided below a level to which the liquid ethyl ether 10 is filled. Thus, the vaporization of the liquid ethyl ether 10 in the torso portion 2 is promoted to increase the pressure difference between the liquefying portion 14 and the torso portion 2, so that the elevation of the liquid ethyl ether in the first communication pipe 3 is promoted.

Figure 18:
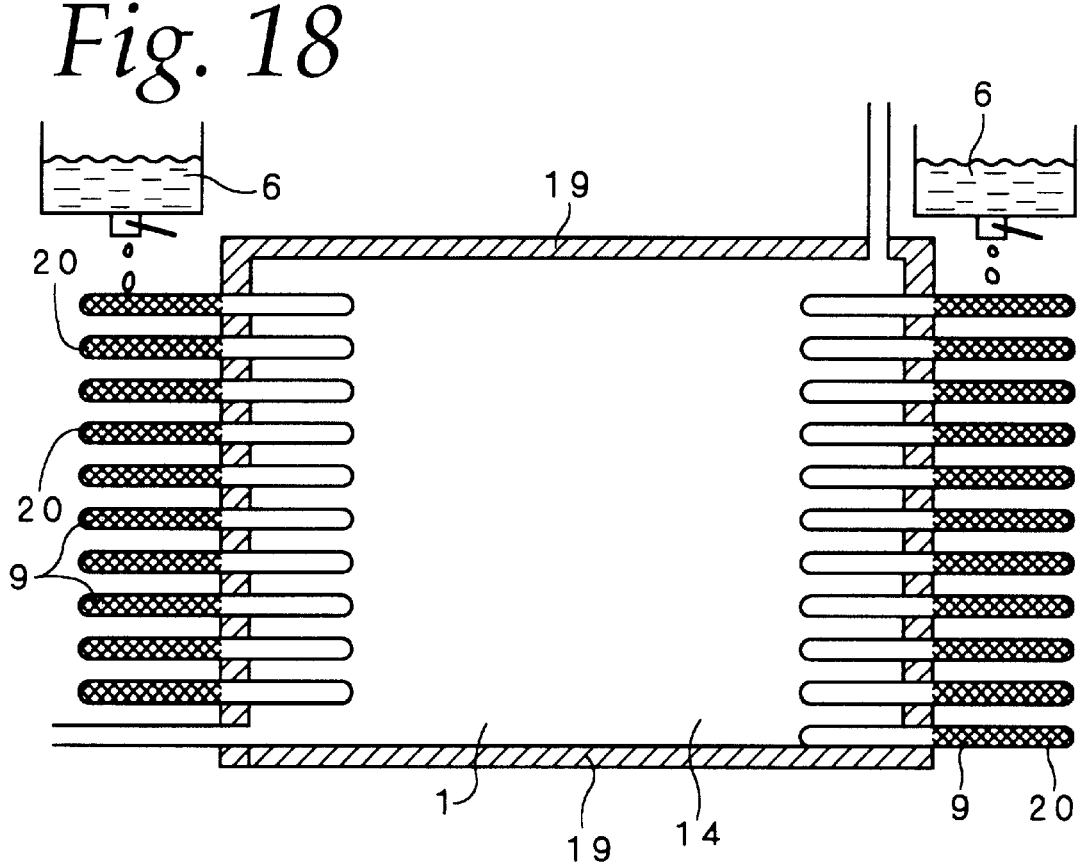
FIG. 18 is a see-through front view illustrating an improved head portion or liquefying portion on a greater scale.

FIG. 18 shows a construction which includes an improvement in the head portion (low temperature portion, low pressure portion, liquefying chamber) 1 or the liquefying portion 14.

The interior surfaces of all the six walls are covered with a heat insulator 19, and heat pipes 20 are provided. The heat pipes 20 are affixed with cloths 9, which are wetted with drops of water from water dripping vessels 6 for more efficient cooling of the head portion (low temperature portion, low pressure portion) 1 or the liquefying portion 14.

Figure 19:
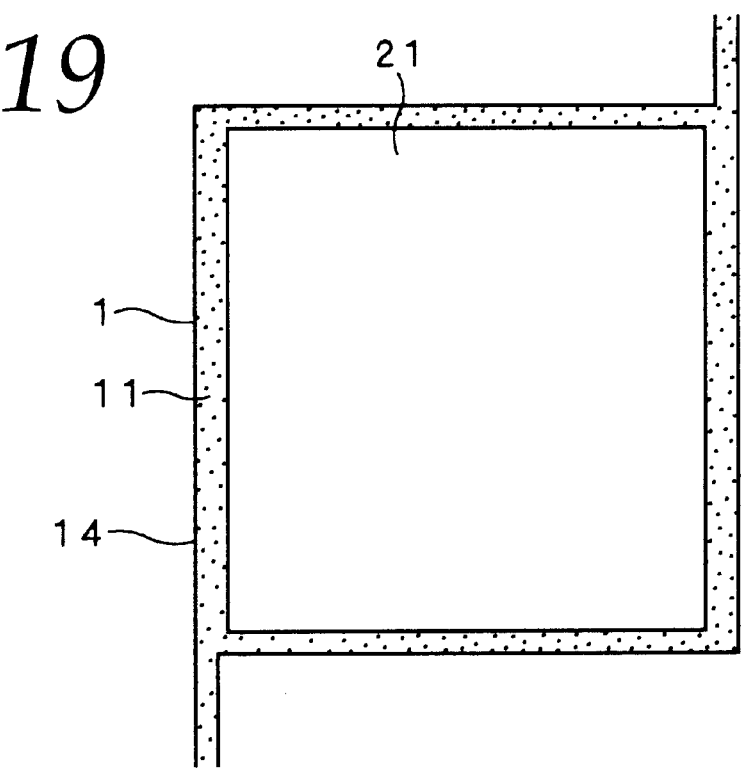
FIG. 19 is a see-through front view illustrating an improved head portion or liquefying portion on a greater scale.
Figure 20:
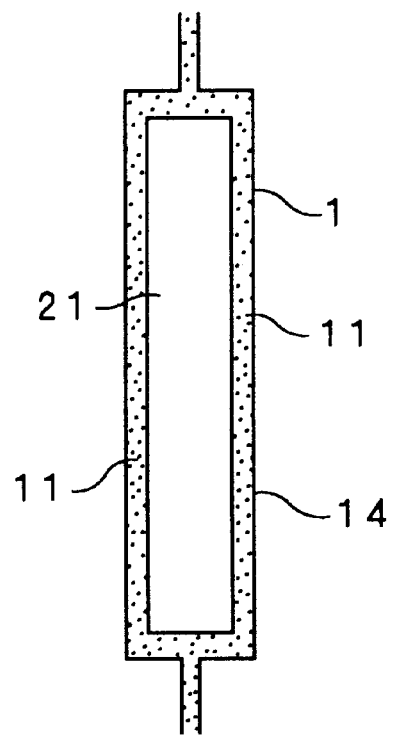
FIG. 20 is a see-through side view illustrating an improved head portion or liquefying portion on a greater scale.

FIGS. 19 and 20 show a construction which includes an improvement in the head portion (low temperature portion, low pressure portion, liquefying chamber) 1 or the liquefying portion 14.

Opposite side walls are formed of metal (copper) plates. The size and, hence, surface area of the liquefying portion 14 are increased so that the liquefaction of the inside gaseous ethyl ether is promoted. Even with this arrangement, the gaseous ethyl ether 11 present in the central portion of the head portion 1 or the liquefying portion 14 is so far from the metal plates that heat transfer and, hence, cooling are difficult. Since the gaseous ethyl ether 11 in the central portion is not easily liquefied, a space box 21 is provided to occupy and reduce the inside space. Thus, the volume of the inside space is reduced. With the provision of the space box, the volume of the gaseous ethyl ether 11 unliquefied in the inside space is reduced, so that the liquefaction efficiency is increased.

Figure 21:
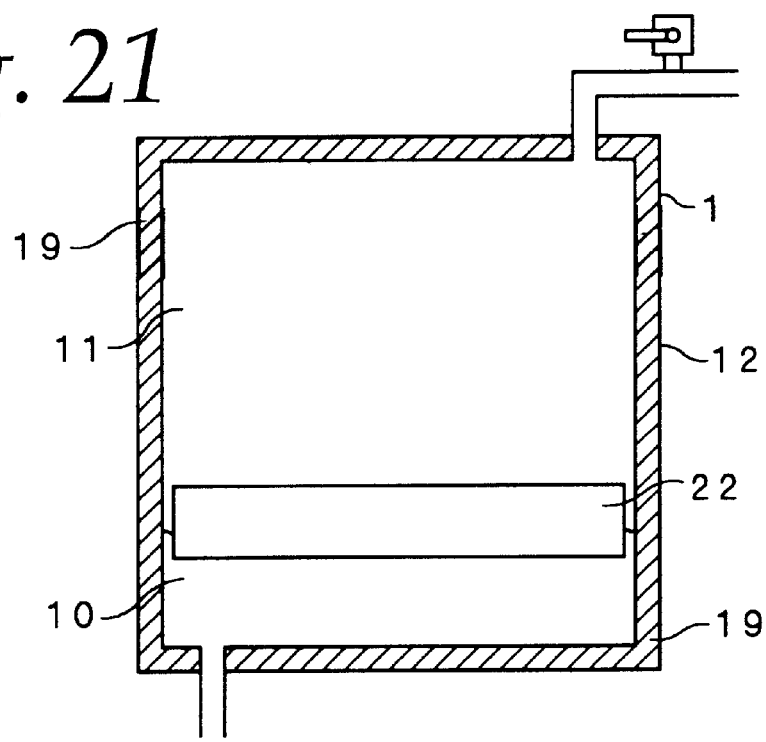
FIG. 21 is a see-through front view illustrating an improved head portion or liquid trap portion on a greater scale.

FIG. 21 shows a construction which includes an improvement in the head portion (low temperature portion, low pressure portion, liquefying chamber) 1 or the liquid trap portion 12. The interior surfaces of all the six walls are covered with a heat insulator 19, and a floating plate (cover member) 22 is provided therein. The floating plate 22 has a size and a configuration which are slightly smaller than a space defined by the interior surfaces of the heat insulator. With the provision of the floating plate 22 which covers the surface of the liquid ethyl ether rising in the first communication pipe 3, the exposed surface area of the liquid ethyl ether 10 is reduced. Therefore, the vaporization of the liquid ether 10 is reduced when the liquefaction of the gaseous ethyl ether in the head portion 1 is promoted to reduce the pressure, so that unnecessary excessive vaporization of the liquid ethyl ether is suppressed. Thus, the reduction in the liquefaction efficiency of the gaseous ethyl ether 11 can be prevented which may otherwise occur due to dew-point elevation.

Figure 22:
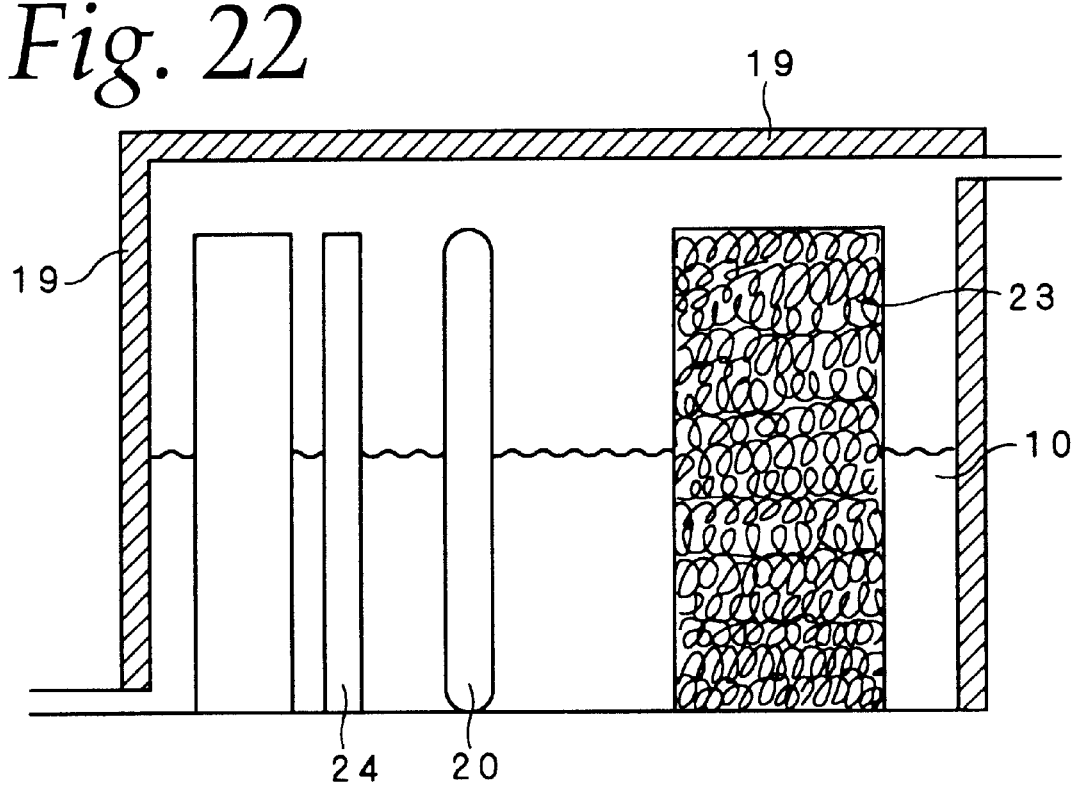
FIG. 22 is a see-through front view illustrating an improved torso portion on a greater scale.

FIG. 22 shows a construction which includes an improvement in the torso portion (high temperature portion, high pressure portion, vaporizing chamber) 2.

The ceiling and the interior surfaces of the four side walls are covered with a heat insulator 19. A metal (copper) plate is provided at the bottom. A copper filter 23, a copper pipe 24, a copper plate and a heat pipe 20 each having a height which is higher than the level of liquid ethyl ether 10 are provided as extending from the bottom. These heat exchanging means absorb a greater amount of heat from the atmosphere through the bottom to promote the vaporization of the liquid ethyl ether 10. This enhances the pressure build-up, so that the pressure difference between the torso portion 2 and the head portion 1 is increased. Thus, the rise of the liquid ethyl ether in the first communication pipe 3 is promoted.

Figure 23:
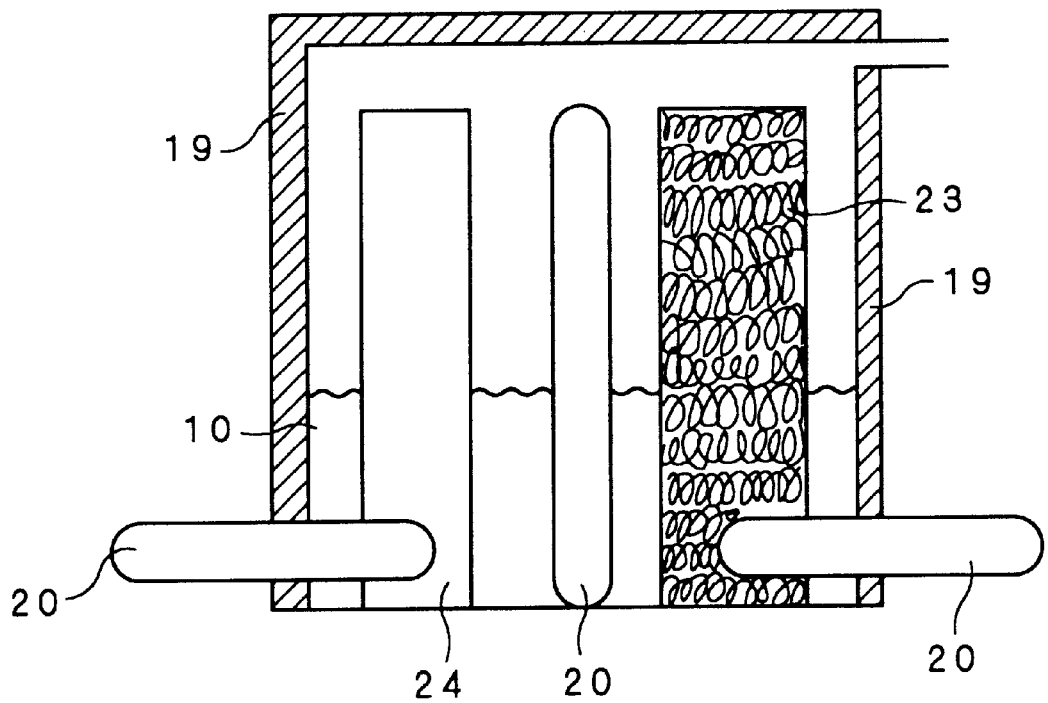
FIG. 23 is a see-through front view illustrating an improved torso portion on a greater scale.

FIG. 23 illustrates an improved torso portion 2 which includes the advantages shown in FIGS. 17 and 22.

Figure 24:
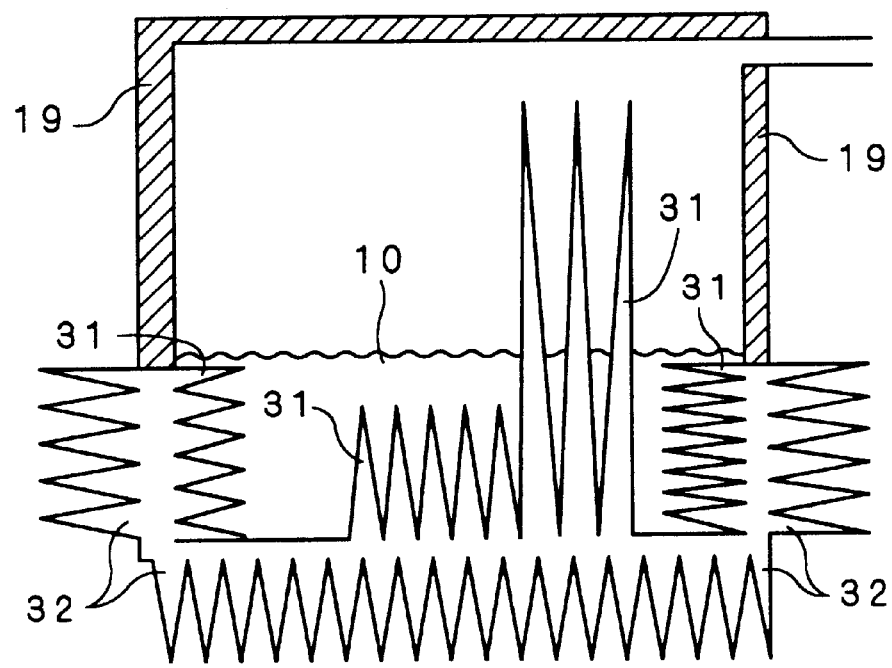
FIG. 24 is a see-through front view illustrating an improved torso portion on a greater scale.

FIG. 24 shows a construction which includes an improvement in the torso portion (high temperature portion, high pressure portion, vaporizing chamber) 2.

One exemplary method of increasing the surface area for the heat absorption and the heat release is to provide heat release folds 31 on the interior surfaces of the four side walls below the level of the liquid ethyl ether 10 and to provide heat adsorption folds 32 on the exterior surfaces of the side walls. Heat release folds 31 are provided on the interior of the bottom. The folds extend above or below the level of the liquid ethyl ether 10. Heat absorption folds 32 are provided on the exterior of the bottom. These heat exchange means absorb a greater amount of atmospheric heat from the four side walls and the bottom to promote the vaporization of the liquid ethyl ether 10. This enhances the pressure build-up, so that the pressure difference between the torso portion 2 and the head portion 1 is increased. Thus, the rise of the liquid ethyl ether in the first communication pipe 3 can be promoted.

In the foregoing explanation, the torso portion (high temperature portion, high pressure portion, vaporizing chamber) 2 is placed in the atmosphere, but may be placed in a great amount of fluid, e.g., in liquid such as sea water. Since liquid generally has a higher heat capacity, the thermal efficiency is higher in the liquid than in the atmosphere. A greater amount of heat of the sea water is absorbed through the six walls to promote the vaporization of the liquid ethyl ether 10. This enhances the pressure build-up.

Figure 25:
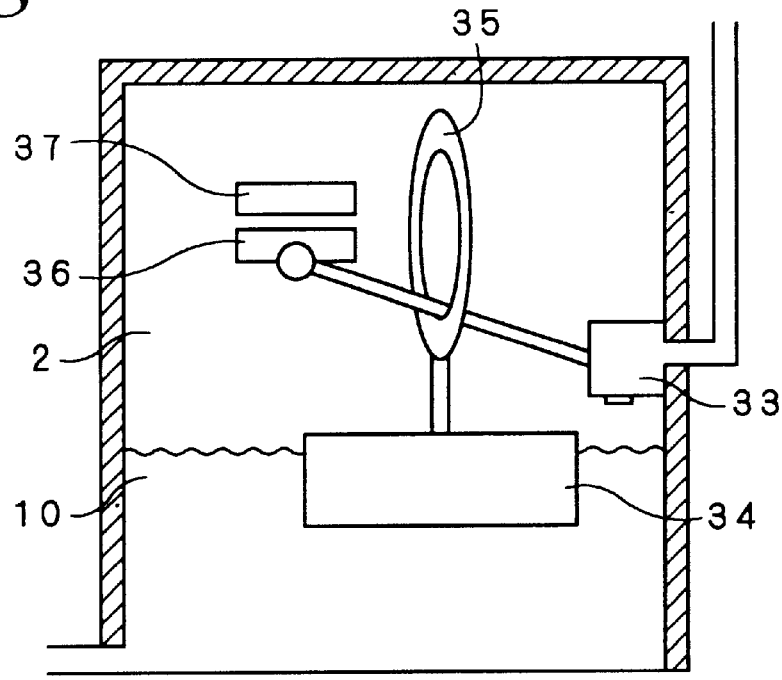
FIG. 25 is see-through front view illustrating an intermittent float valve on a greater scale.

FIG. 25 illustrates a construction which includes a further drastic improvement in the on-off valve 5.

An intermittent float valve is provided instead of the on-off valve 5 in the torso portion 2. Although the on-off valve 5 is provided outside and adapted to be manually opened and closed at the stage of the development, the intermittent float valve adapted to be automatically opened and closed is provided in this embodiment. The intermittent float valve is operative to automatically open and close a float valve 33 at predetermined higher and lower levels. An oval ring 35 is provided on a float plate 34. A magnet 36 is provided at an end of a rod extending from the float valve 33.

Another magnet 37 to be attracted by the magnet 36 is fixed at a predetermined level. Thus, the float valve 33 is constructed to be closed when the level of the liquid ethyl ether is elevated in the torso portion 2, and to be opened when the level of the liquid ethyl ether is lowered in the torso portion 2.

FIG. 25 illustrates a state where the liquid ethyl ether 10 is further accumulated to the highest level so that the float valve 33 is pushed up to be closed. With the float valve 33 being closed, the gaseous ethyl ether is liquefied in the liquefying portion 14 to reduce the pressure, and the gaseous ethyl ether is vaporized in the torso portion 2 to increase the pressure as described above. The pressure difference causes the liquid ethyl ether 10 in the torso portion 2 to rise into the first communication pipe 3, so that the level of the liquid is lowered in the torso portion 2. The lowering of the liquid level in the torso portion 2 causes the upper portion of the ring 35 to lower the rod extending from the float valve 33 thereby to open the float valve 33. With the float valve 33 being open, the liquefying portion 14 and the torso portion 2 communicate with each other via the second communication pipe 4 so that the pressure difference therebetween is reduced. Thus, the liquid ethyl ether flows down in the first communication pipe 3. When a predetermined amount of the liquid flows down, the liquid ethyl ether 10 is gradually accumulated and then the lower portion of the ring 35 presses down the rod of the float valve 33 to close the float valve 33. Thus, the float valve 33 is automatically and repeatedly opened and closed by the up and down of the level of the liquid ethyl ether 10. This arrangement may be provided in the liquid trap portion 12 or the head portion 1.

Figure 26:
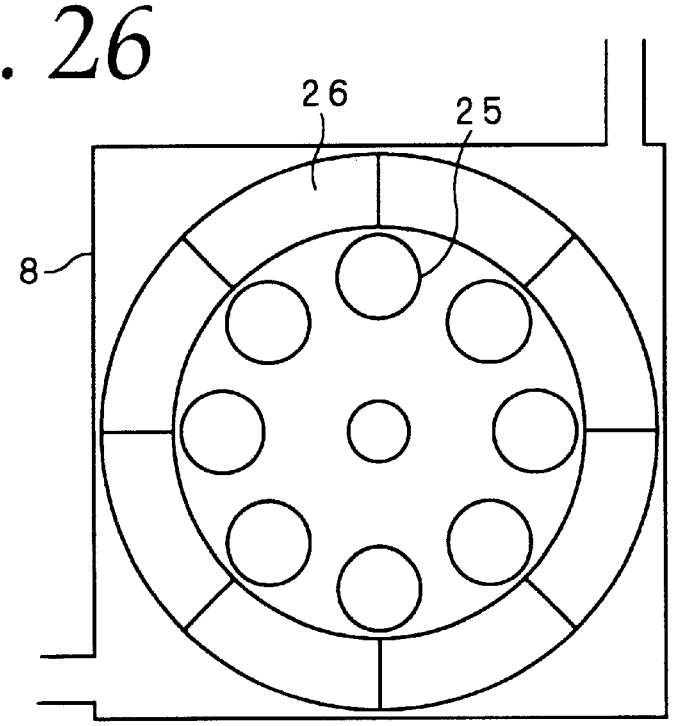
FIG. 26 is a see-through front view illustrating an impeller box on a greater scale.
Figure 27:
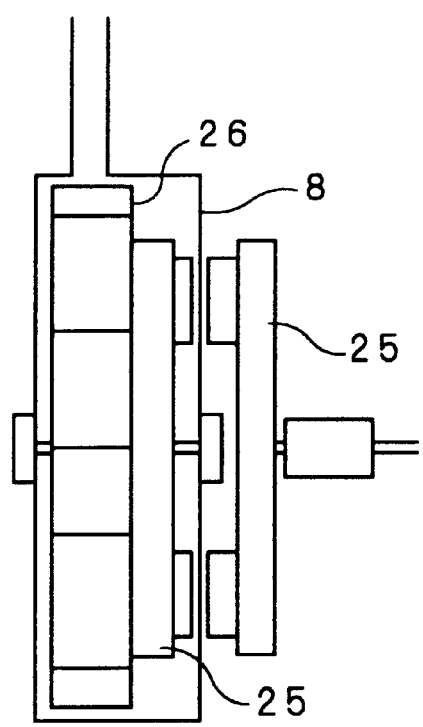
FIG. 27 is a see-through side view illustrating the impeller box on a greater scale.

FIGS. 26 and 27 are diagrams illustrating the impeller box 8 in detail.

A magnetic plate 25 is provided on an impeller plate 26 on a side face of an impeller (rotary wheel) within the impeller box 8. A magnetic plate 25 having a free shaft is provided outside the impeller box. The torque of the inside impeller is transmitted to the outside by magnetic coupling without contact.

Figure 28:
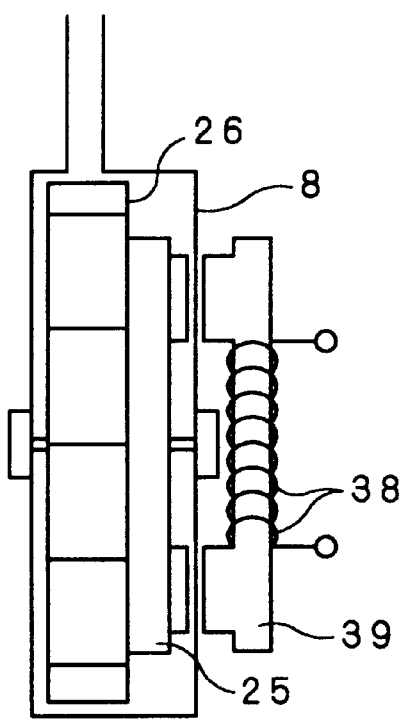
FIG. 28 is a see-through side view illustrating an improved impeller box on a greater scale.

FIG. 28 illustrates a modification of the impeller box shown in FIGS. 26 and 27.

A magnetic plate 25 is provided on an impeller plate 26 within the box. An iron core (magnetic circuit, power generator) 39 with a coil 38 of multiple turns fitted therearound is provided outside the box. The torque of the magnetic plate 25 provided on the impeller is directly converted into alternating current by an electric magnetic induction effect, whereby the electric energy can effectively be utilized.

Figure 29:
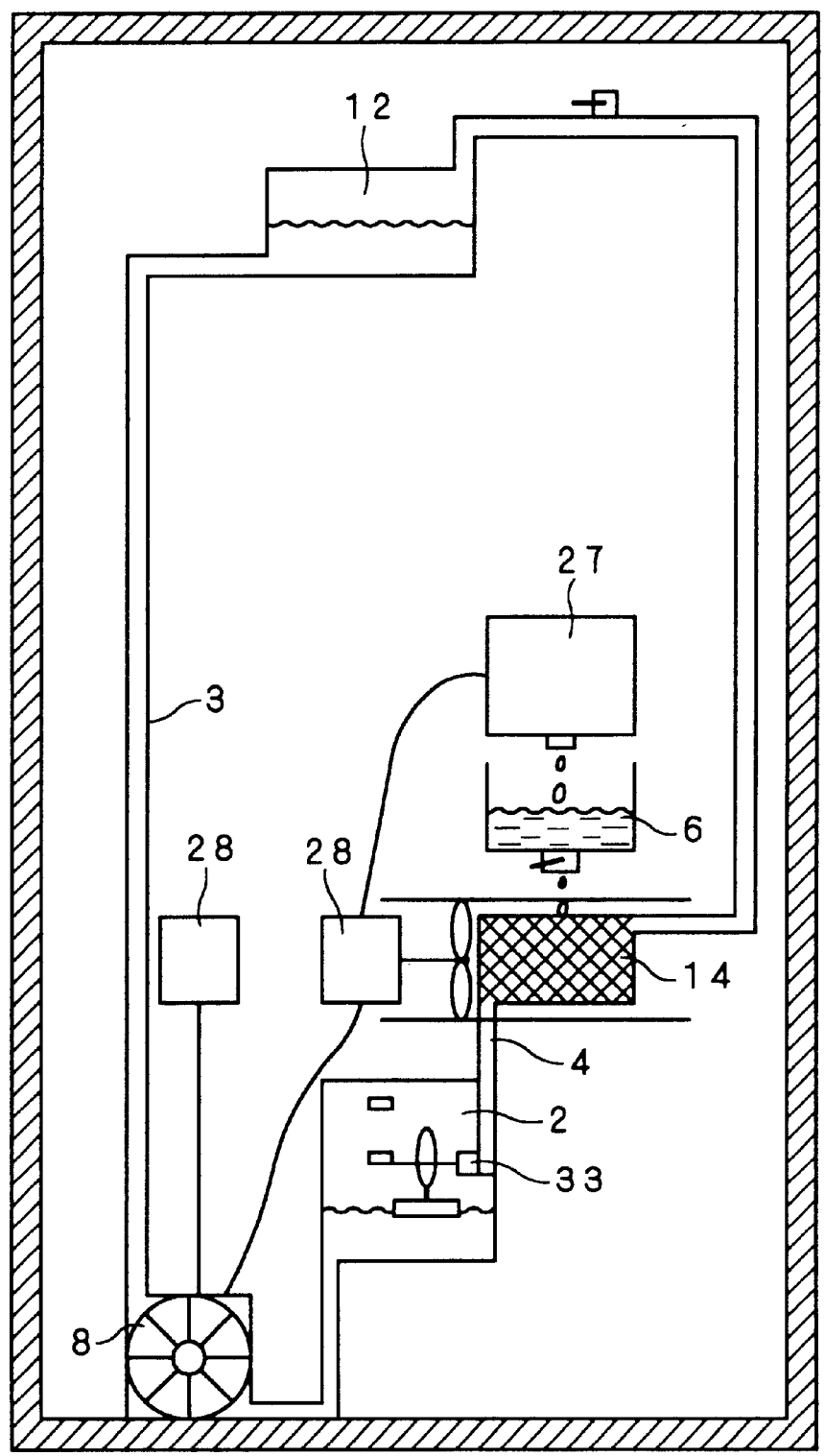
FIG. 29 is a front view of the overall construction of the present invention in the ultimate form.

FIG. 29 illustrates another embodiment of the present invention.

The construction shown in FIG. 29 will be described in detail. This is a thermally-insulated independent system, and has a dehumidifier 27 of a high dehumidifying efficiency. These two points are notable differences from the construction shown in FIG. 16. This system has a motor 28.

The ground of this system will be described. In this system, the humidity is increased to a saturated level due to a great amount of steam produced by vaporization at the liquefying portion 14, so that the vaporization of water which cools the liquefying portion 14 is stopped. Therefore, the ordinary temperature heat engine is stopped. However, the dehumidifier 27 in FIG. 29 is kept operative. A part of energy produced by the impeller box 8 is utilized for the operation of the humidifier. The steam thus removed is condensed into water, which is returned to the water dripping vessel 6. When the steam is liquefied, condensation heat is generated, and returned into the system and the high temperature portion 2. The work energy generated by the motor 28 is converted into heat, which is returned into the system and the high temperature portion 2. Thus, the electric energy generated by the impeller box 8 and the power generator is utilized for the cooling of the liquefying portion (liquefying chamber) 14 and for the heating of the high temperature (vaporizing chamber) 2. This process sequence is repeated. Since the dehumidification is continuously performed, the water is continuously evaporated, whereby the ordinary temperature heat engine continuously and efficiently operates. Therefore, the motor 28 also continuously works to efficiently generate energy. Thus, the electric energy generated by the flow down of the liquid ethyl ether is utilized for the cooling of the liquefying portion (liquefying chamber) 14 and for the heating of the high temperature portion (vaporizing chamber) 2. Further, the up and down of the liquid ethyl ether in the first communication pipe 3 is promoted, so that the ordinary temperature heat engine can operate very efficiently.

The volatile liquid or the operating medium liquid employed in the foregoing embodiments is ethyl ether, but not limited thereto. Any of various liquids which are liquefied at a temperature lower than the ordinary temperature and vaporized at a temperature not lower than the ordinary temperature may be employed.

INDUSTRIAL APPLICABILITY

As described above, the present invention provides a feasible ordinary temperature heat engine. The feasible ordinary temperature heat engine is capable of converting heat such as in the atmosphere, the sea water and the sun into useful kinetic energy and/or electric energy. The present invention has solved the energy problems in the human world. The very dangerous nuclear power generation can be obviated. The hydraulic power generation which generally relies on the nature can also be obviated. The thermal power generation which generally relies on foreign countries can also be obviated. The present invention provides a power generator and/or a heat engine, which is clean and free from global environmental pollution.

What is claimed is:

1. An ordinary temperature heat engine comprising: a liquefying chamber in which a volatile liquid filled therein is liquefied at a temperature lower than an ordinary temperature; a vaporizing chamber in which a volatile liquid retained therein is vaporized at a temperature not lower than the ordinary temperature; a first communication pipe for communication between the liquefying chamber and a port provided at a level lower than the level of the volatile liquid in the vaporizing chamber; and a second communication pipe for communication between the liquefying chamber and a port provided at a level higher than the level of the volatile liquid in the vaporizing chamber, wherein the first communication pipe has a liquid level elevating portion which vertically extends for allowing the level of the volatile liquid to be elevated therein by a pressure difference between the liquefying chamber and the vaporizing chamber, wherein a liquid trap portion is provided at the midportion of the first communication pipe separately from the liquefying chamber, wherein an on-off valve is provided in the second communication pipe for increasing and reducing the pressure difference between the liquefying chamber and the vaporizing chamber, whereby the volatile liquid is repeatedly caused to rise in the first communication pipe to be accumulated in the liquid trap portion and flow down by opening and closing the on-off valve.

2. An ordinary temperature heat engine as set forth in claim 1, wherein energy converting means for converting kinetic energy of the volatile liquid into other kind of energy is provided in the liquid level elevating portion of the first communication pipe, the kinetic energy being produced by allowing the volatile liquid to flow down in the first communication pipe when the pressure difference between the liquefying chamber and the vaporizing chamber is reduced.

3. An ordinary temperature heat engine as set forth in claim 1, wherein heat exchange means for promoting the vaporization of the inside volatile liquid is provided in the vaporizing chamber.

4. An ordinary temperature heat engine as set forth in claim 1, wherein a cover member is provided for covering the surface of the volatile liquid rising in the liquid level elevating portion of the first communication pipe.

5. An ordinary temperature heat engine as set forth in claim 1, which is adapted to close the on-off valve when the level of the volatile liquid within the vaporizing chamber is elevated and to open the on-off valve when the level of the volatile liquid within the vaporizing chamber is lowered.

6. An ordinary temperature heat engine as set forth in claim 1, wherein the energy converting means comprises a rotary wheel to be rotated by the volatile liquid flowing down in the first communication pipe, and a power generator for generating electricity by a torque of the rotary wheel, wherein an electric energy generated by the power generator is utilized for cooling the liquefying chamber and for heating the vaporizing chamber.

7. An ordinary temperature heat engine as set forth in claim 1, wherein heat exchange means for promoting the vaporization of the inside volatile liquid is provided in the liquefying chamber.

8. An ordinary temperature heat engine as set forth in claim 1, wherein the liquid trap portion is located at a level higher than the liquefying chamber.

9. An ordinary temperature heat engine as set forth in claim 1, wherein a rotary fan is provided for blowing air onto the liquefying chamber to cool the liquefying chamber for improvement of liquefying efficiency.

10. An ordinary temperature heat engine as set forth in claim 9, wherein the kinetic energy of the volatile liquid flowing down in the first communication pipe is utilized for generation of the torque of the rotary fan.

11. An ordinary temperature heat engine as set forth in claim 1, wherein a dehumidifier is provided for generation of water for cooling the liquefying chamber.

* * * * *